United States Patent [19]

Beckmann

[11] 3,986,050

[45] Oct. 12, 1976

[54] FIRING ARRANGEMENT FOR A NUMBER OF ELECTRIC VALVES, PARTICULARLY OF THYRISTORS

[75] Inventor: Oskar Beckmann, St. Polten, Austria

[73] Assignee: Siemens Aktiengesellschaft, Munich, Germany

[22] Filed: Mar. 20, 1975

[21] Appl. No.: 560,386

[30] Foreign Application Priority Data
Mar. 25, 1974 Germany............................ 2414198

[52] U.S. Cl. ........................... 307/252 L; 250/578; 315/185 R; 340/147 R; 343/225
[51] Int. Cl.² ........................................ H03K 17/56
[58] Field of Search .......... 250/209, 216, 228, 551, 250/578; 307/311, 252 L; 315/149, 152, 153, 155, 157, 159, 185 R, 188; 240/93; 350/169–173; 343/225, 228; 340/147 R

[56] References Cited
UNITED STATES PATENTS

| | | |
|---|---|---|
| 3,422,273 | 1/1969 | Biernson ......................... 250/578 X |
| 3,502,910 | 3/1970 | Johanson-Brown............. 307/311 X |
| 3,524,986 | 8/1970 | Harnden, Jr. .................... 250/551 X |
| 3,646,427 | 2/1972 | Koval et al....................... 250/239 X |
| 3,713,101 | 1/1973 | Piccone et al................. 307/252 L X |
| 3,820,903 | 6/1974 | Kindl et al. ...................... 350/171 X |

OTHER PUBLICATIONS

*Single Lamp Matrix Illuminator*, Mix, IBM Technical Disclosure Bulletin, vol. 12, No. 4, Sept. 1969, p. 522.

*Primary Examiner*—Eugene La Roche
*Attorney, Agent, or Firm*—Kenyon & Kenyon Reilly Carr & Chapin

[57] ABSTRACT

A firing arrangement for firing a number of electric valves is disclosed in which a body is provided for reflecting and/or refracting electromagnetic radiation toward electromagnetic radiation detectors included in the individual firing circuits controlling the valves.

13 Claims, 2 Drawing Figures

FIRING ARRANGEMENT FOR A NUMBER OF ELECTRIC VALVES, PARTICULARLY OF THYRISTORS

BACKGROUND OF THE INVENTION

1. Field of the Invention

The invention concerns a firing arrangement for a number of electric valves, particularly thyristors. More specifically, the invention concerns a firing arrangement for electric valves each of whose control path is associated with a firing circuit having a detector capable of detecting electromagnetic radiation and, thus, of being acted upon by wireless means via such radiation generated by a transmitter which is controlled by a firing control signal.

2. Description of the Prior Art

It is already known (German Pat. No. 1,538,099) that an electric valve and, in particular, a thyristor, can be fired using a firing circuit which derives its firing energy from the voltage at the anode-cathode path of the valve itself. In such a circuit, a pulse capacitor is charged by means of this voltage and, when required, is discharged onto the control path of the valve via a switching element. The latter element, in turn, is typically a light-controlled thyristor which is triggered by light radiation from a light source placed some distance away. In this type of firing circuit, the electric potential differences which exist between the light source, as the transmitter of electromagnetic radiation, and the electric valve have no effect on the firing. As a result, such a firing circuit can be used advantageously for firing electric valves being employed with high voltages and, in particular, for firing high-voltage thyristors which are used in static converter arrangements.

In German Patent Application No. P. 23 60 662.4, there is disclosed another technique for the wireless transmission, via electromagnetic radiation, of a firing control signal to a firing circuit which is equipped with a detector for detecting such radiation. With this technique, high-frequency radiation is employed as the electromagnetic radiation. As a result, as with the previous technique, the transmission path is free of most interference, thereby making it also particularly suitable for the firing of thyristors which are being used in the aforementioned static converters.

Typically, for wireless firing of electric valves, a line-of-sight path must exist between the transmitter, on the one hand, and the individual detectors, on the other hand. This is true for optical as well as for high-frequency transmission paths. This line-of-sight requirement places severe limitations on the type of design which can be used for the firing arrangement in which the electric valves are being employed.

It is, therefore, an object of the present invention to provide, in a firing arrangement of the above-described type, more degrees of freedom regarding its design and its mechanical layout without disturbing the ability of the arrangement to transmit firing signals. In other words, an arrangement having more latitude in the physical arrangement of its detectors and firing circuits is to be provided. In this connection, it should be noted that the present arrangement does not require that a line-of-sight path exist between the transmitter and the individual detectors. The last-mentioned factor is important particularly for the transmission of firing signals via a high-frequency transmission path.

SUMMARY OF THE INVENTION

According to a first embodiment of the invention, the above and other objectives are accomplished by including, in a firing arrangement of the above-described type, a body for refracting the radiation emitted by the transmitter of the arrangement in the direction of or toward the detectors thereof.

According to a second embodiment of the invention, the above-described arrangement is provided with a body for reflecting the emitted radiation toward the detectors.

In both embodiments, the individual detectors are placed so that the radiation refracted and/or reflected by the body falls on their radiation-sensitive inputs. Both embodiments, moreover, can be employed together.

The ray-refracting and/or reflecting body employed in the present invention can in principle assume any desired form. However, in general, the form of the body will be dictated by the manner in which the detectors and firing circuits are arranged. In particular, it is usually required that a mutual safety distance be provided between such components, the latter distance in each case being determined by the electric potential situation of the electric valves. A dense area arrangement of the detectors can be obtained if, observing this safety distance, the detectors are arranged symmetrically, e.g., on a cylindrical surface, on a rectangle or on a circle. In such case, therefore, the detectors will be offset in space with respect to each other and be symmetrically arranged on a surface which is aligned symmetrically to the body. As a result, with this arrangement of the detectors, the body preferably will be a symmetrical structure.

In the case where the radiation emitted by the transmitter is a parallel beam and the body acts as a reflector, the body can be made in the form of a cone whose apex points toward the transmitter. Instead of a cone, the body can also be made in the form of a pyramid whose apex also points toward the transmitter. Such a pyramid may, but need not have, plane side surfaces.

Also for the case of a parallel beam, but where the body acts as both a reflector and refractor, the body can take the form of two cones or pyramids of a radiation-refracting material, the latter cones being put together at their bases.

The body can also be shaped so that it focusses the radiation emitted by the transmitter onto the detectors. In such case, the body acts as a focussing lens for the radiation and the individual detectors are advantageously arranged in a line. Where many detectors are to be used, it is more advantageous to shape the body so that it acts as a diverging lens. Again, both the aforesaid forms of the body are particularly suited for use with a parallel beam.

It should be noted that the embodiments of the invention described hereinabove can be employed with electromagnetic radiation which is in the form of light in the visible range of the spectrum, infrared light or high-frequency radiation. The high-frequency radiation may, for example, be in the gigahertz range.

As the material of the body, a plastic, e.g., the polyfluoroethylene known under the trademark "Teflon", may be used. However, it is also possible, using high-frequency radiation, to use as the base material of the body a plastic which is mixed with finely distributed metal particles, e.g., gold or silver dust. Such a material has a much higher dielectric constant than the dielectric base material.

BRIEF DESCRIPTION OF THE DRAWING

The above and other features of the invention will become more apparent upon reading the following detailed description in conjunction with the accompanying drawing, in which.

DETAILED DESCRIPTION

Figure 1:
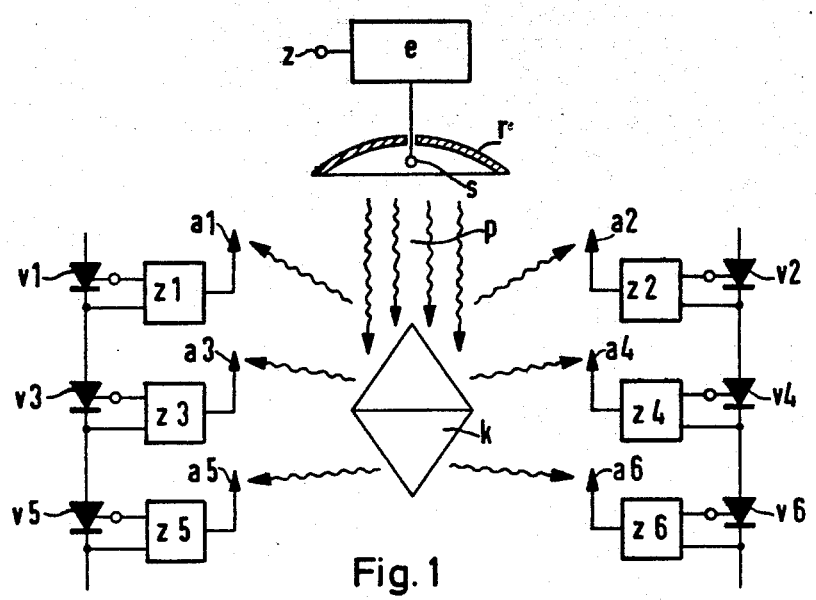
FIG. 1 shows a first firing arrangement in accord with the invention in which a dielectric body for refracting and reflecting high-frequency radiation is employed.

In FIG. 1, a firing arrangement for a number of electric valves is shown schematically.

As illustrated, the arrangement is to provide firing signals for a total of six controlled valves $v1$ to $v6$, each of which might be thyristor. It is assumed that the valves $v1$, $v3$ and $v5$ on the one hand, and $v2$, $v4$ and $v6$ on the other hand, are connected in series. These series circuits, in turn, may form part of a static converter for a high-voltage d-c transmission system. Each valve $v1$ to $v6$ is rated, for instance, at a voltage of 1 kV. In order to remove the dissipation heat developed in operation, the individual valves $v1$ to $v6$ may further be equipped with heat sinks (not shown) and cooling fins, which require a certain amount of space. To simplify the following explanation, it is assumed that the two series circuits of the valves $v1$, $v3$, $v5$ and $v2$, $v4$, $v6$, respectively, are connected in series and are to fire simultaneously.

A firing control signal $z$, which is formed, for instance, in a control circuit (not shown) having the function of keeping the voltage or the frequency of the converter controlled by the valves constant, is provided for firing the valves $v1$ to $v6$. This firing signal control signal $z$ is fed to a transmitter $e$ which is equipped with a radiating head or radiator $s$ shown as a point source. The transmitter $e$ may be, for instance, a voltage source switched on and off by the firing control signal $z$ and the radiator $s$, an incandescent lamp or a light-emitting diode. The transmitter $e$ might also be a high-frequency transmitter which radiates high-frequency radiation via a high-frequency antenna serving as the radiator $s$. In the latter case an antenna with a parabolic reflector or a dipole antenna can be used as the high-frequency antenna.

The frequency of the high-frequency radiation emitted by radiator $s$ may be, for instance, 2.4 GHz. In such case, the energy is situated in the so-called S-band. Such frequency might also be one above 300 MHz. The electromagnetic radiation emitted by the transmitter $e$ may, therefore, be in the visible portion of the spectrum, but also in the infrared or ultraviolet portion of the spectrum.

As can be seen from FIG. 1, the radiator $s$ is arranged inside a reflector $r$. This reflector $r$ is shown in cross section. Its inside surface may be metallic. The reflector $r$ is designed as a parabolic mirror in such a way that it furnishes a parallel electromagnetic ray beam $p$, whose direction of radiation is indicated by the wavy arrows. The reflector $r$ may be arranged at the ceiling of a building or at the ceiling of an enclosure which surrounds the electric valves to be controlled. In such case, the electromagnetic radiation used for the wireless firing of the valves $v1$ to $v6$ would be directed downward. The reflector $r$ may instead also be arranged on the floor of the building, so that it radiates vertically up. Radiation from the side is also possible.

Associated with the control paths of the six electric valves $v1$ to $v6$ are firing circuits $z1$ to $z6$, respectively. Included in the circuits $z1$ to $z6$ are the electromagnetic radiation detectors $a1$ to $a6$, respectively. The six detectors $a1$ to $a6$ are arranged at some distance from the reflector r on two straight lines aligned parallel to the direction of the beam.

If the latter beam is a light beam then the photo diodes or photo transistors may typically be used as the detectors $a1$ to $a6$. If, on the other hand, the beam is a beam of high-frequency radiation, high-frequency antennas followed by receivers may be used as the detectors. In any case, if many detectors are to be employed they can be advantageously arranged on a cylinder surface.

As shown, the detectors $a1$ to $a6$ are arranged closely adjacent to one another in the two straight lines. The distance between the detectors should be such as to prevent corona discharge from occurring.

The six detectors $a1$ to $a6$ are arranged into three groups each of which comprises two detectors. These groups are arranged on top of each other, as viewed in the direction of the radiation. For a larger number of detectors, more detectors per group would be provided. It can be seen from FIG. 1 that the detector pairs $a1$, $a2$ and the detector pairs $a3$, $a4$ as well as the detector pairs $a5$, $a6$ are each arranged in a group plane of their own, the spacing between these group planes being the same. The three group planes are, therefore, aligned parallel to each other. The detectors $a1$, $a2$ of the upper, the detectors $a3$, $a4$ of the middle and the detectors $a5$, $a6$ of the lower group plane are each arranged in accordance with a symmetrical figure. In the present case, the symmetrical figure for each group is a circle. This can be observed more clearly through a view in the beam direction of the transmitter $e$.

It should be pointed out that the detectors of adjacent group planes need not be arranged in line as shown in FIG. 1, but might also be arranged so as to be offset from one another. In such case, the detectors of one group might be aligned with the gaps between the detectors of the adjacent group. It should further be pointed out that the detectors $a1$ to $a6$ may be arranged in their respective group planes so as to conform to figures other than a circle such as, for example, a rectangular, oval or ellipse.

The parallel beam $p$ emitted by the transmitter $e$ falls on a symmetrical body $k$ which partly reflects and partly refracts the beam. The reflected as well as the refracted radiation is utilized for firing the valves $v1$ to $v6$.

In the present illustrative case, the body $k$ comprises two cones or pyramids which are placed together at their bases and which are formed from a radiation-refracting material. The apex of the one cone or pyramid points in the direction of the transmitter $s$. For high-frequency radiation, the body $k$ can be formed from a plastic, e.g., polyfluoroethylene. Such a material is dielectric, so that there is no danger of discharges. As can be appreciated, the radiation reflected by the upper cone or pyramid of the body $k$ is partly directed to the detectors $a1$ to $a4$, where it triggers, in the succeeding firing circuits $z1$ to $z4$ firing pulses for the valves v1 to v4. The radiation refracted in the two cones or pyramids, on the other hand, is partly directed to the detectors a5 and a6. This refracted radiation thus triggers, in the succeeding firing circuits z5 and z6, firing pulses for the valves v5 and v6.

Figure 2:
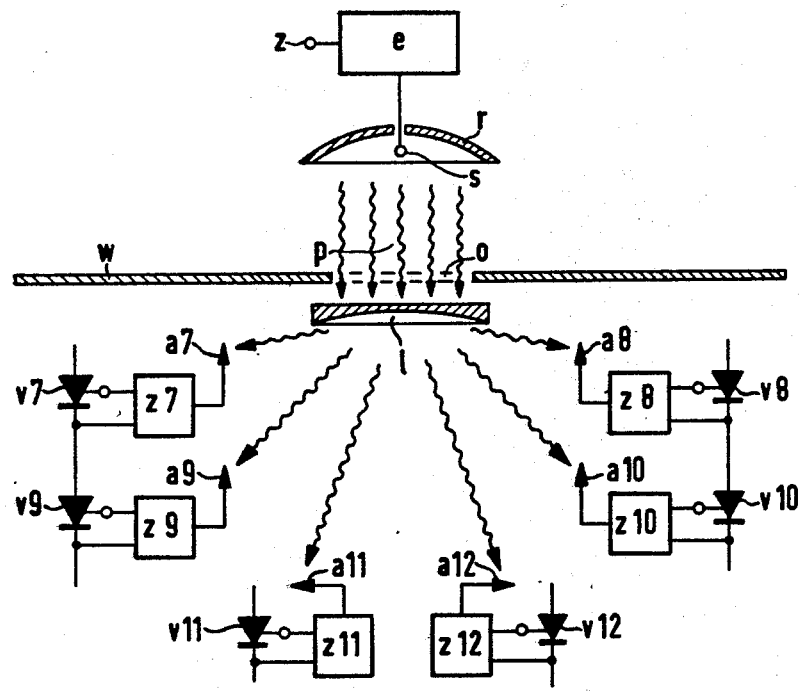
FIG. 2 shows a second firing arrangement in which the dielectric body is shaped so as to diverge an incident beam of radiation.

In FIG. 2, a firing arrangement for a number of electric valves v7 to v12 is shown, schematically. The valves v7 to v12 are to be fired simultaneously via the firing circuits z7 to z12, respectively, the latter circuits being equipped with respective detectors a7 to a12 for detecting electromagnetic radiation. As shown, the detectors a7 to a12 are arranged symmetrically in the shape of a U. For a larger number of detectors, the individual detectors can be disposed, for instance on the wall of a cylindrical member.

A transmitter e equipped with a radiator s and a reflector r radiates electromagnetic radiation in the form of a parallel beam p in dependence on a firing control signal z applied to the transmitter. The beam p is directed through an aperture o in an obstruction w, which, for example, might be the wall of an oil tank which does not allow a line-of-sight transmission between the radiator s and the detectors a7 to a10, to a body 1. The body 1 comprises a dielectric material and is in the form of a diverging lens. As a result, it refracts the beam p causing it to diverge and, thus, to be directed toward the individual detectors a7 to a12. Since use of the body makes line-of-sight transmission between the radiator s and all the detectors a7 to a12 unnecessary, there is now considerable latitude in the physical arrangement of the detectors a7 to a12 on the other side of the obstacle w.

What is claimed is:

1. A firing arrangement for firing a number of electric valves having control paths comprising:
   a. a transmitter for emitting high frequency electromagnetic radiation as a parallel beam;
   b. a plurality of firing circuits, each associated with a control path of one of said number of electric valves and each including a detector for detecting high frequency electromagnetic radiation; and
   c. a reflector having angled surfaces terminating in a point pointing in the direction of said transmitter such that the parallel beam therefrom is incident upon said surfaces and reflected therefrom, said surfaces being selected so as to reflect said radiation toward each of said plurality of detectors, said detectors being disposed such that there is not a direct line of radiation between said transmitter and said detectors and being arranged on a surface which is aligned symmetrically to said reflector.

2. A firing arrangement in accordance with claim 1 in which said body comprises a plastic material.

3. A firing arrangement in accordance with claim 1 in which said body comprises a dielectric base material and finely distributed metal particles mixed in said base material.

4. Apparatus according to claim 1 wherein said reflector is a pyramid having an apex pointing toward said transmitter with the axis of said pyramid parallel to said parallel beam and wherein said detectors are disposed in planes essentially perpendicular to said electromagnetic beam.

5. Apparatus as in claim 1 wherein said high frequency radiation is in the gigahertz range.

6. Apparatus according to claim 1 wherein said reflector comprises a cone having its apex pointing toward said transmitter with its axis parallel to said parallel beam and wherein a group of said detectors is arranged on a circle which is perpendicular to the parallel beam.

7. Apparatus as in claim 6 wherein said high frequency radiation is in the gigahertz range.

8. A firing arrangement for firing a number of electric valves having control paths comprising:
   a. a transmitter for emitting high frequency electromagnetic radiation as a parallel beam;
   b. a plurality of firing circuits, each associated with a control path of one of said number of electric valves and each including a detector for detecting high frequency electromagnetic radiation; and
   c. a diverging lens for defracting said parallel beam toward each of said detectors said detectors being disposed such that there is not a direct line of radiation between said transmitter and said detectors and being arranged on a surface which is aligned symmetrically to said diverging lens.

9. Apparatus as in claim 8 wherein said high frequency is in the gigahertz range.

10. A firing arrangement for firing a number of electric valves having control paths comprising:
    a. a transmitter for emitting high frequency electromagnetic radiation as a parallel beam;
    b. a plurality of firing circuits, each associated with a control path for one of said number of electric valves and each including a detector for detecting high frequency electromagnetic radiation, said detectors being disposed such that there is not a direct line of radiation between said transmitter and said detectors;
    c. a first member having angled reflecting surfaces terminating in a point pointing in the direction of said transmitter and a base perpendicular to said parallel beam, such that at least a portion of said parallel beam therefrom is incident upon said surfaces and reflected therefrom, said surfaces being selected so as to reflect said radiation toward at least some of said plurality of detectors; and
    d. a second member of similar construction having its base abutting the base of said first member, both said first member and said second member being comprised of a radiation refractive material, whereby a portion of said radiation will be reflected by said first member to some of said detectors with the remaining radiation passing therethrough and refracted by said second member to others of said detectors.

11. A firing arrangement in accordance with claim 10 in which said body comrpises two conical members whose bases face one another, said members being comprised of a radiation refracting material.

12. A firing arrangement in accordance with claim 10 in which said body comprises two pyramidal members whose bases face one another, said members being comprises of a radiation-refracting material.

13. Apparatus as in claim 10 wherein said high frequency radiation is in the gigahertz range.

* * * * *